United States Patent
Henderson

(10) Patent No.: US 7,048,490 B2
(45) Date of Patent: May 23, 2006

(54) SIDE SERVICE STORAGE APPARATUS

(75) Inventor: Jack V. Henderson, West Bloomfield, MI (US)

(73) Assignee: Decoma International Inc., Concord (CA)

( * ) Notice: Subject to any disclaimer, the term of this patent is extended or adjusted under 35 U.S.C. 154(b) by 117 days.

(21) Appl. No.: 10/701,922

(22) Filed: Nov. 5, 2003

(65) Prior Publication Data

US 2004/0131455 A1   Jul. 8, 2004

Related U.S. Application Data

(60) Provisional application No. 60/424,453, filed on Nov. 7, 2002.

(51) Int. Cl.
*B60P 9/042* (2006.01)

(52) U.S. Cl. .................. 414/462; 224/310; 248/324; 414/917

(58) Field of Classification Search ............ 224/310; 414/462, 626, 917; 248/324
See application file for complete search history.

(56) References Cited

U.S. PATENT DOCUMENTS

| | | | |
|---|---|---|---|
| 2,318,971 A | 5/1943 | Roumage et al. | |
| 2,715,974 A | 8/1955 | Van Nest | |
| 3,193,124 A | 7/1965 | Essling | |
| 3,963,136 A | 6/1976 | Spanke | |
| 4,376,611 A * | 3/1983 | Koop | 414/462 |
| 4,446,998 A | 5/1984 | Taig | |
| 4,682,719 A | 7/1987 | Ernst et al. | |
| 4,685,860 A * | 8/1987 | McFarland | 414/720 |
| 4,887,750 A | 12/1989 | Dainty | |
| 4,969,793 A * | 11/1990 | Pawl | 414/462 |
| 5,058,791 A | 10/1991 | Henriquez et al. | |
| 5,297,912 A | 3/1994 | Levi | |
| 5,346,355 A | 9/1994 | Riemer | |
| 5,360,150 A | 11/1994 | Praz | |
| 5,360,151 A | 11/1994 | Fine | |
| 5,423,650 A | 6/1995 | Zerbst et al. | |
| 5,505,579 A | 4/1996 | Ray et al. | |
| 5,544,796 A | 8/1996 | Dubach | |
| 5,649,655 A | 7/1997 | Kerner | |
| 5,884,824 A | 3/1999 | Spring, Jr. | |
| 5,975,830 A * | 11/1999 | Goodrich et al. | 414/541 |
| 5,988,470 A | 11/1999 | Siciliano | |
| 6,427,889 B1 | 8/2002 | Levi | |
| 6,428,263 B1 | 8/2002 | Schellens | |
| 2002/0117523 A1 | 8/2002 | Ketterhagen | |

FOREIGN PATENT DOCUMENTS

| | | | |
|---|---|---|---|
| JP | 2000-118309 A | * | 4/2000 |
| JP | 2001-163122 A | * | 6/2001 |

* cited by examiner

*Primary Examiner*—Thomas J. Brahan
(74) *Attorney, Agent, or Firm*—Clark Hill PLC

(57) ABSTRACT

A roof rack assembly is provided for storage of items above a roof of a motor vehicle. The roof rack assembly includes a frame having front and rear guides extending across the roof. A front rail slidingly engages the front guide, and a rear rail slidingly engages the rear guide. A tray is coupled to the front and rear guides. The tray is movable between a storage position above the roof and a loading position alongside the motor vehicle. A plurality of drop down links extends between the tray and each of the front and rear rails. The plurality of drop down links maintains the tray in a horizontal orientation as the tray moves between the storage and loading positions. A scissor linkage extends between the plurality of drop down links to selectively lock the tray in the loading position.

26 Claims, 5 Drawing Sheets

SIDE SERVICE STORAGE APPARATUS

CROSS REFERENCE TO RELATED APPLICATION

This application claims priority from and the benefit of U.S. provisional patent application Ser. No. 60/424,453, filed Nov. 7, 2002.

FIELD OF THE INVENTION

This invention relates to a roof rack assembly for a motor vehicle. More particularly, the invention relates to a roof rack assembly including a tray that remains horizontal relative to the ground as it moves between storage and loading positions.

DESCRIPTION OF THE RELATED ART

Roof racks allow for secure placement and storage of items above a roof of a motor vehicle. Roof racks are especially useful for storing large items and irregularly shaped items, such as bicycles or canoes, that do not normally fit inside the motor vehicle. The storing of the items on the roof rack increases storage capacity inside the motor vehicle.

There are, however, certain inconveniences associated with roof racks. For example, sport utility vehicles and minivans generally have a roof height above the shoulder level of many individuals. As a result, any item that is to be stored on the roof rack must first be raised above the roof height before loading onto the roof rack. In addition, once the item is raised to the roof it may need to be properly aligned along the roof rack or secured into place. Thus, an individual attempting to load large or heavy items must exert a great deal of effort to utilize the roof rack.

In order to reduce the amount of effort required for raising items to the roof height, various systems and devices have been developed that move the roof rack off of the roof to a loading position closer to the ground. As a result, an item must be raised to a height less than the roof height for loading the item onto the roof rack. One problem that is encountered with such movable roof racks is that when the roof rack is in the loading position, the roof rack extends at a downwards angle relative to the ground. By keeping the roof rack horizontal relative to the ground, certain items are able to be loaded onto the roof rack without the need for securing the items to the roof rack.

One example of a movable roof rack that is maintained in a horizontal orientation relative to the ground is disclosed in U.S. Pat. No. 5,360,150 to Praz. In this reference, a roof rack includes a support bar mounted to a roof of a motor vehicle. The support bar includes a tubular stationary structure. The stationary structure houses a mobile element having a slide, rods, and a support portion. The mobile element slides into and out of the stationary structure. The rods connect the support portion to the support bar. Each of the rods is pivotally secured to the slide at one end, and pivotally secured to the support portion at the other end. When the mobile element is extracted from the stationary structure, the support bar extends laterally in order to lower the roof rack to an extracted position. The support portion remains horizontal as the roof rack is lowered due to the pivoting of the rods. In an alternative embodiment, the rods are vertically spaced apart from one another. As a result, the attachment points of each of the rods to the support portion are horizontally spaced apart.

SUMMARY OF THE INVENTION

According to one aspect of the invention, a roof rack assembly is provided for storage of items above a roof of a motor vehicle. The roof rack assembly includes a frame having front and rear guides extending across the roof. A front rail slidingly engages the front guide, and a rear rail slidingly engages the rear guide. A tray is coupled to the front and rear guides. The tray is movable between a storage position above the roof and a loading position alongside the motor vehicle. A plurality of drop down links extends between the tray and each of the front and rear rails. The plurality of drop down links maintains the tray in a horizontal orientation as the tray moves between the storage and loading positions. A scissor linkage extends between the plurality of drop down links to selectively lock the tray in the loading position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
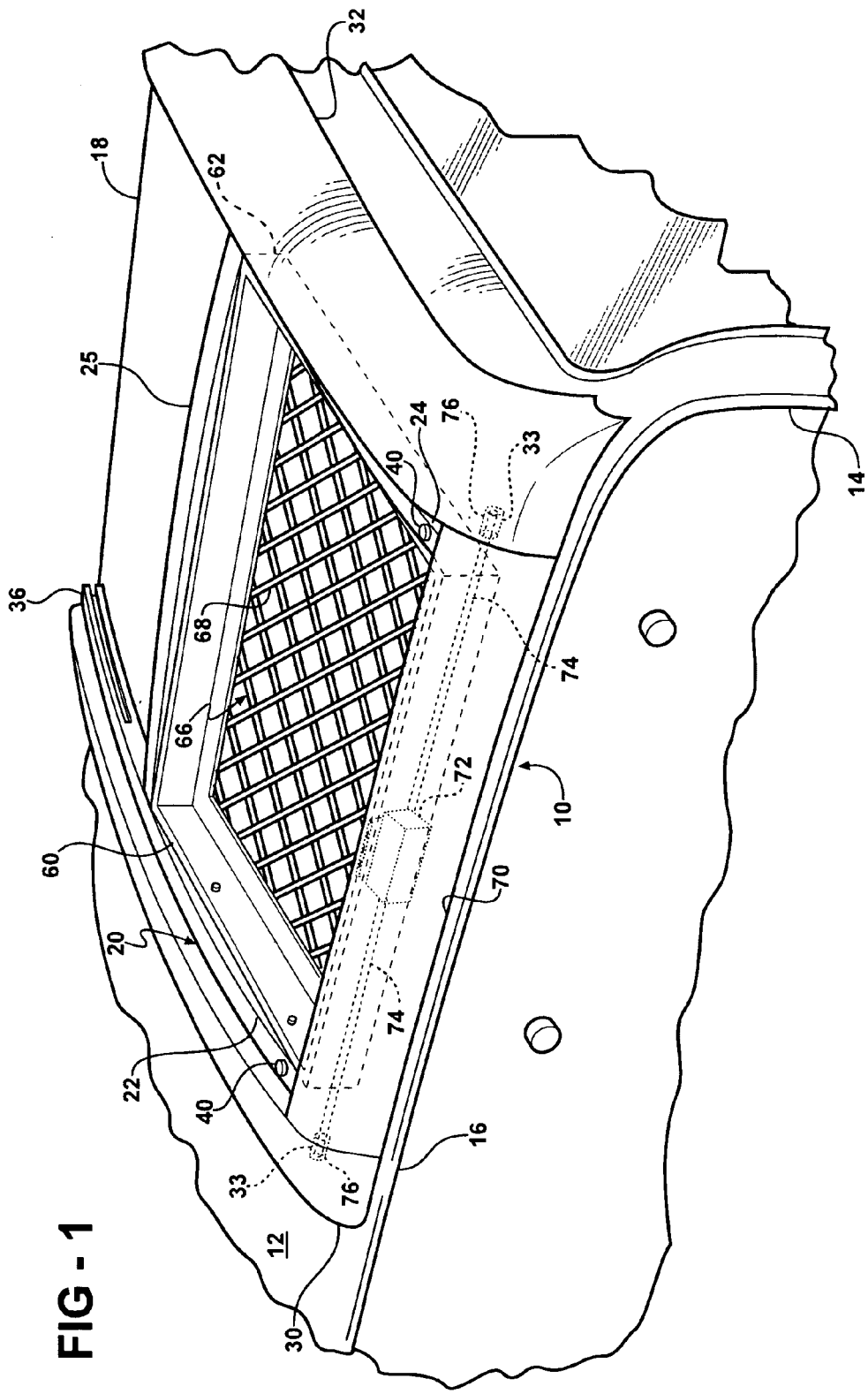
FIG. 1 is a fragmentary, perspective view of a motor vehicle including a roof rack assembly according to one embodiment of the invention having a tray in a storage position.
Figure 2:
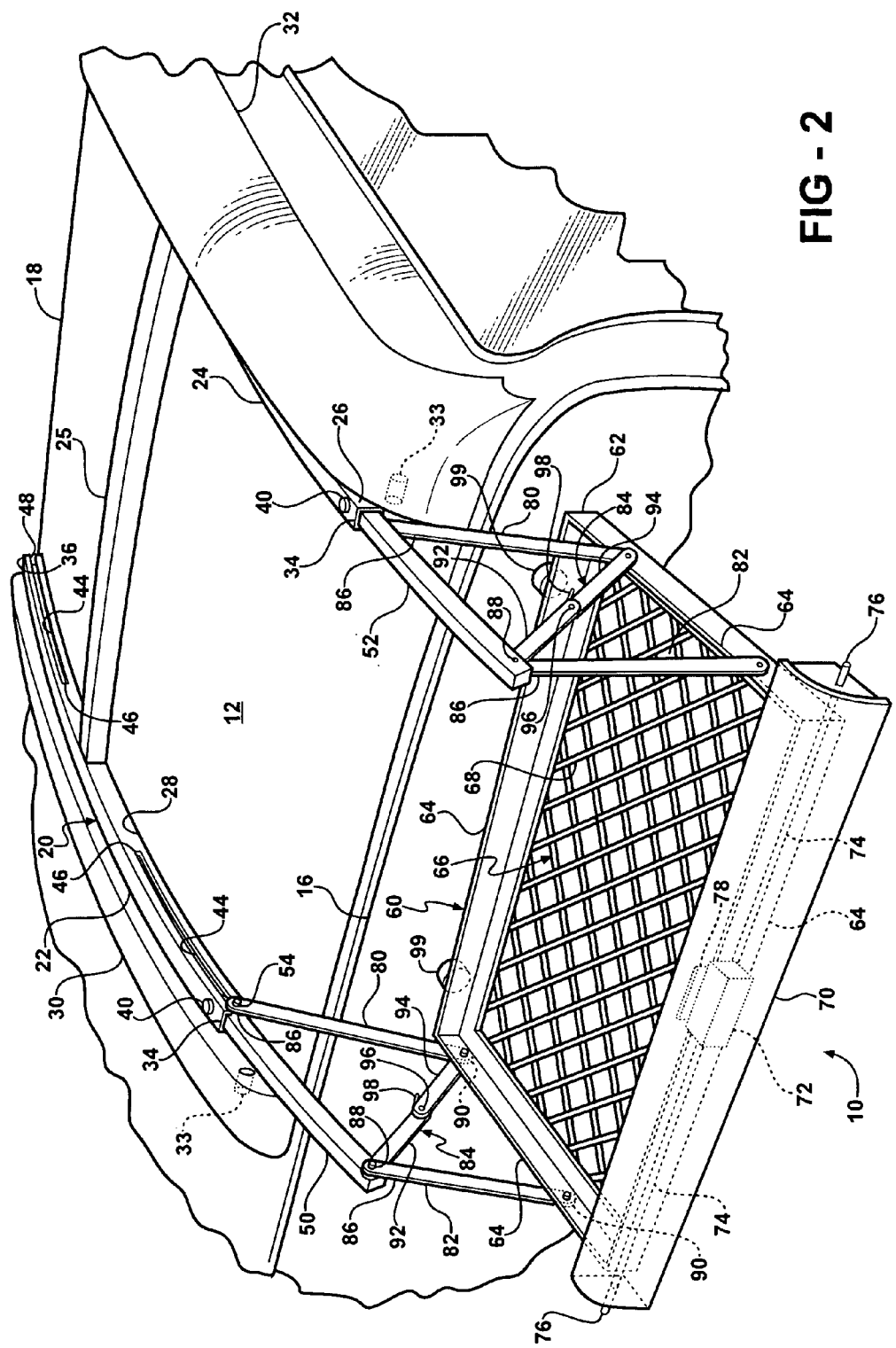
FIG. 2 is a fragmentary, perspective view of the motor vehicle including the tray in a loading position.
Figure 3:
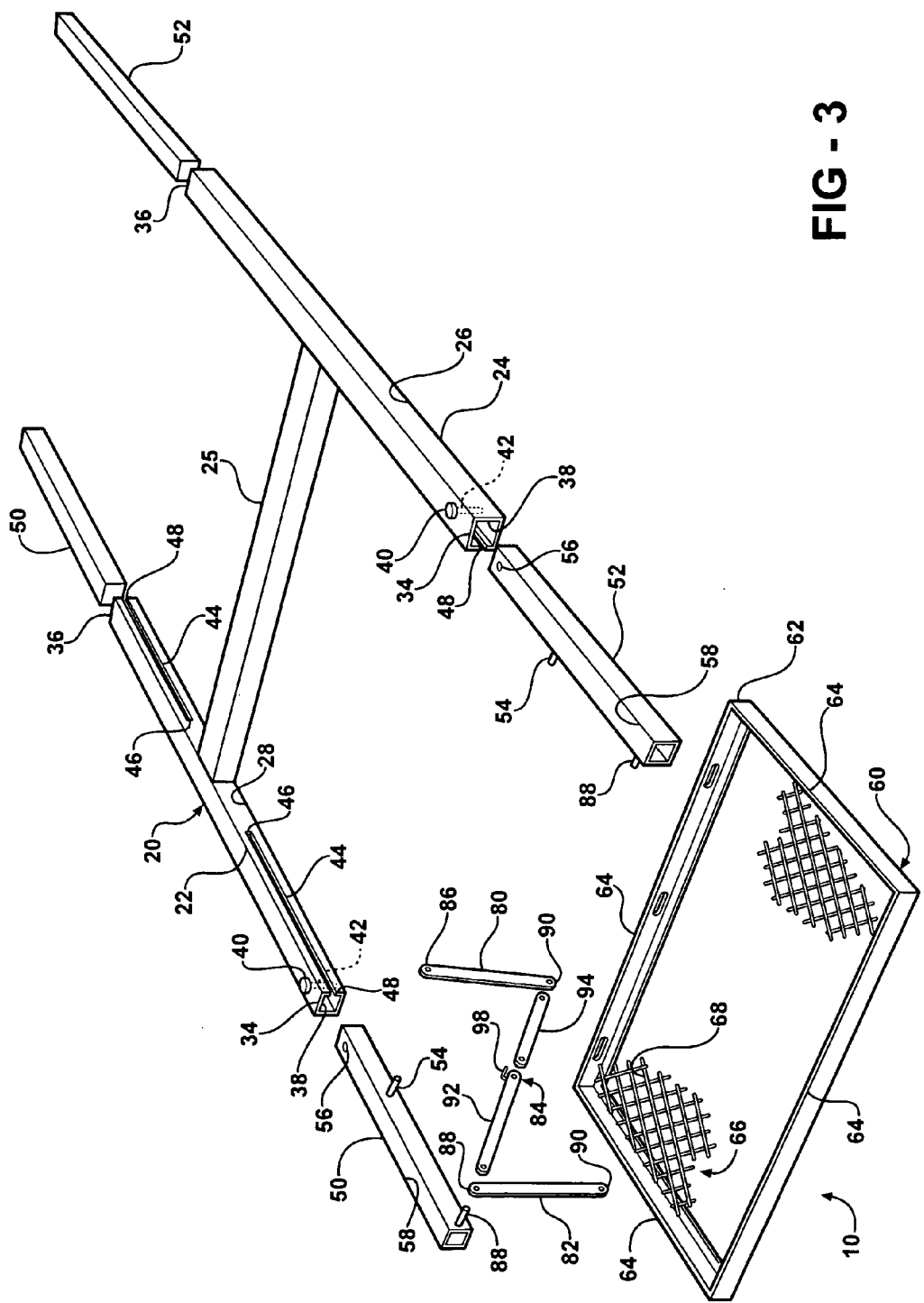
FIG. 3 is an exploded, perspective view of the roof rack assembly.

Referring to FIGS. 1 through 3, a roof rack assembly, generally shown at 10, is mounted along a roof 12 of a motor vehicle 14. The roof rack assembly 10 allows for storage of items above the roof 12 during motor vehicle operation. The roof rack assembly 10 is shown extending from one of a pair of opposing sides 16, 18 of the roof 12. It will, however, be appreciated that the roof rack assembly 10 may extend from the front, the rear, or either side 16, 18 of the roof 12.

The roof rack assembly 10 includes a frame, generally indicated at 20, fixedly secured to the roof 12. The frame 20 includes spaced apart and parallel front 22 and rear 24 guides. Each of the front 22 and rear 24 guides includes an outboard surface 26 and an opposing inboard surface 28. A center guide 25 extends between the front 22 and rear 24 guides. The front 22, rear 24, and center 25 guides extend across the roof 12 in a path that approximates the contour thereof.

A front panel 30 is fixedly secured to the roof 12 directly adjacent to the outboard surface 26 of the front guide 22, and a rear panel 32 is fixedly secured to the roof 12 directly adjacent to the outboard surface 26 of the rear guide 24. The front 30 and rear 32 panels each include a receiving hole 33, as described in further detail below. The front 30 and rear 32 panels integrate the roof rack assembly 10 into the overall appearance of the motor vehicle 14.

The front 22 and rear 24 guides each extend between guide ends 34, 36. Each of the front 22 and rear 24 guides define an interior 38, best shown in FIG. 3. The interior 38 extends between the guide ends 34, 36.

A raised hub 40 is formed along the front 22 and rear 24 guides adjacent to at least one of the guide ends 34, 36. A spring loaded pin 42 is housed within the raised hub 40, as shown in FIG. 3. The spring loaded pin 42 extends from the raised hub 40 into the interior 38 of each of the front 22 and rear 24 guides. The spring loaded pin 42 is biased towards a fully extended position.

An elongated slot 44 extends along the inboard surface 28 of each of the front 22 and rear 24 guides. Each elongated slot 44 includes a closed end 46 and an open end 48. The open end 48 of each elongated slot 44 is adjacent to one of the guide ends 34, 36.

The roof rack assembly 10 also includes a front rail 50 slidingly engaging the front guide 22, and a rear rail 52 slidingly engaging the rear guide 24. The front 50 and rear 52 rails each include a sliding pin 54 extending outwardly therefrom. The sliding pins 54 slidingly engage the elongated slot 44 of the front 22 and rear 24 guides. The movement of the sliding pin 54 along each of the elongated slots 44 moves the front 50 and rear 52 rails into and out of the front 22 and rear 24 guides.

Referring to FIG. 3, each of the front 50 and rear 52 rails also includes a pin catch hole 56. The pin catch hole 56 is positioned along a top surface 58 of each of the front 50 and rear 52 rails. Generally, as the front 50 and rear 52 rails move along the front 22 and rear 24 guides, each spring loaded pin 42 abuts the top surface 58 short of its fully extended position. But when the spring loaded pins 42 reach the pin catch holes 56, the spring loaded pins 42 release to the fully extended position inside of the pin catch holes 56. The release of the spring loaded pins 42 into the pin catch holes 56 stops the front 50 and rear 52 rails from disengaging from the front 22 and rear 24 guides. The spring loaded pins 42 each include a lever (not shown) that retracts the spring loaded pin 42 out of the pin catch hole 56 to allow sliding engagement between the front 50 and rear 52 rails and the front 22 and rear 24 guides. It should, however, be appreciated that the spring loaded pin 42 may be coupled to the rails 50, 52 and that the pin catch hole 56 may be located along the guides 22, 24.

Referring once again to FIGS. 1 through 3, a tray, generally indicated at 60, is pivotally coupled to the front 50 and rear 52 rails. The tray 60 includes a generally rectangular tray frame 62 having four L-shaped sides 64. The tray 60 also includes a floor, generally indicated at 66, extending between the sides 64. The floor 66 defines a plurality of openings 68. The plurality of openings 68 is shown as being generally diamond-shaped but it should be appreciated that the exact shape of the plurality of openings 68 may vary. The plurality of openings 68 prevents water from accumulating in the tray 60 and contributes to weight reduction of the tray 60.

The tray 60 is movable between a storage position, shown in FIG. 1, above the roof 12, and a loading position, shown in FIG. 2, extending below the roof 12 and alongside the motor vehicle 14. The tray 60 moves between the storage and loading positions as the front 50 and rear 52 rails slide into and out of the front 22 and rear 24 guides.

A closeout panel 70 is fixedly secured to the tray 60 along the outermost side 64 thereof. The closeout panel 70 houses a latch mechanism 72. The latch mechanism 72 includes oppositely extending locking rods 74 each terminating at a distal end 76. The locking rods 74 selectively engage the receiving holes 33 along the front 30 and rear 32 panels to lock the tray 60 in the storage position. A handle 78 is operatively connected to the locking rods 74. Actuation of the handle 78 draws the locking rods 74 out of the receiving holes 33 to release the latch mechanism 72 and allow the tray 60 to move out of the storage position. The handle 78 is also actuated in order to lock the tray 60 back in the storage position.

Referring to FIGS. 2 and 3, a plurality of drop down links 80, 82 interconnects the tray 60 and each of the front 50 and rear 52 rails. A scissor linkage, generally indicated at 84, extends between two of the plurality of drop down links 80, 82. Since the connection of the plurality of drop down links 80, 82 and the scissor linkage 84 to the front 50 and rear 52 rails is the same, only the connection of the plurality of drop down links 80, 82 and the scissor linkage 84 to the front rail 50 will be described below with the understanding that the same applies equally to the rear rail 52.

In a preferred embodiment, the plurality of drop down links 80, 82 includes spaced apart inboard 80 and outboard 82 drop down links. Each of the inboard 80 and outboard 82 drop down links includes an upper end 86 pivotally secured to the front rail 50. More specifically, the inboard drop down link 80 pivots about the sliding pin 54 extending out from the front rail 50 while the outboard drop down link 82 pivots about an outer pin 88 extending out from the front rail 50. In addition, each of the inboard 80 and outboard 82 drop down links includes a lower end 90 pivotally secured to the tray 60.

When the tray 60 is in the storage position, the inboard 80 and outboard 82 drop down links are disposed along the inboard surface 28 of the front guide 22. The front rail 50 slides out of the front guide 22 to move the tray 60 into the loading position. The inboard 80 and outboard 82 drop down links pivot relative to the front rail 50 as the front rail 50 moves out of the front guide 22. At the same time, the lower end 90 of each of the inboard 80 and outboard 82 drop down links drops towards the ground. The inboard 80 and outboard 82 drop down links maintain the tray 60 in a horizontal orientation relative to the ground as the tray 60 moves between its storage and loading positions. The tray 60 does not, therefore, change its orientation relative to the ground.

The scissor linkage 84 includes first 92 and second 94 scissor links. The first 92 and second 94 scissor links are pivotally secured to each other by a center pin 96. More specifically, the first 92 and second 94 scissor links pivot relative to one another as the tray 60 moves between its storage and loading positions. The first scissor link 92 is also pivotally coupled to the front rail 50 by the outer pin 88. The second scissor link 94 is pivotally coupled to the tray 60.

The first scissor link 92 includes a locking tab 98 coupled thereto. The locking tab 98 lockingly engages the second scissor link 94 when the first 92 and second 94 scissor links are in a colinear relationship to lock the tray 60 in the loading position. Engagement of the locking tab 98 maintains the tray 60 in place while in its loading position to prevent the tray 60 from swinging against the motor vehicle 14. A plurality of bumpers 99, shown in FIG. 2, is secured to the innermost side 64 of the tray 60 to further ensure that the tray 60 does not scratch the motor vehicle 14.

Figure 4:
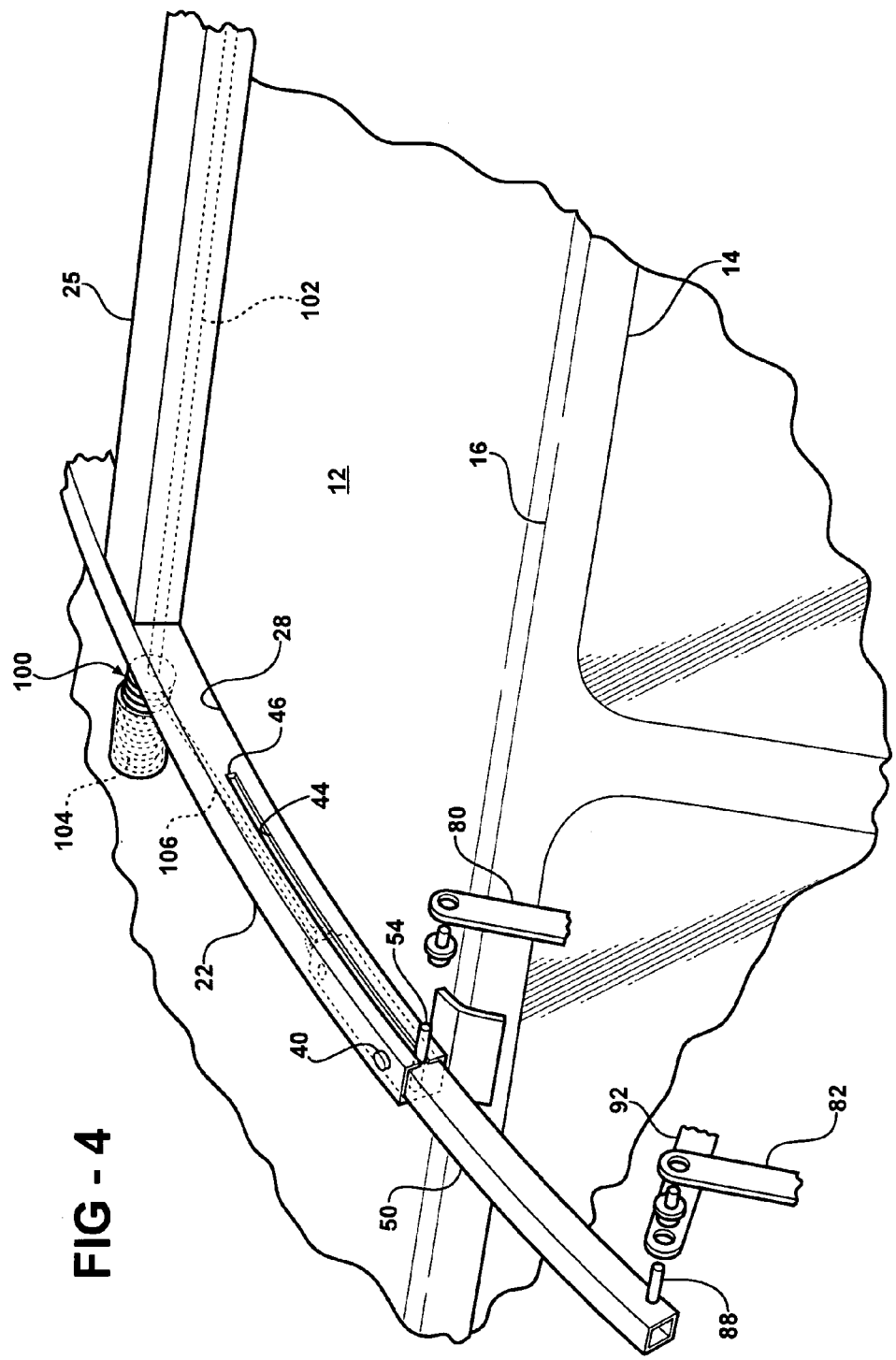
FIG. 4 is a fragmentary, perspective view of the roof rack assembly including a lift assist mechanism.

Referring to FIG. 4, a lift assist mechanism, generally indicated at 100, is provided to aid in movement of the tray 60 from the loading position to the storage position. The lift assist mechanism 100 includes a rod 102, a torsion spring 104, and a pair of cables 106 (one shown).

The rod 102 extends through the center guide 25 between the front 22 and rear 24 guides. The torsion spring 104 is disposed adjacent the front guide 22. The torsion spring 104 is secured to the rod 102. One of the cables 106 extends between the rod 102 and the front rail 50. The other one of the cables 106 extends between the rod 102 and the rear rail 52. Each of the cables 106 is wound around the rod 102.

The movement of the tray 60 from the storage position to the loading position pulls on the cables 106 and causes the rod 102 to rotate in one direction. When the tray 60 is in the loading position, the torsion spring 104 is held in a retracted position under tension. Upon movement of the tray 60 from the loading position to the storage position, the tension in the torsion spring 104 is released. The torsion spring 104 rotates the rod 102 in an opposite direction so that the cables 106 wind around the rod 102. As a result, the tray 60 is urged into its storage position above the roof 12.

It is, however, appreciated that the roof rack assembly 10 is operable without the lift assist mechanism 100 so that movement of the tray 60 between the storage and loading positions is completely manual. It is also appreciated that a motor (not shown) may be operatively connected to the lift assist mechanism 100 to assist in moving the tray 60 from the loading position to the storage position. Further, a reversible motor may be utilized to move the tray 60 between the storage and loading positions.

Figure 5:
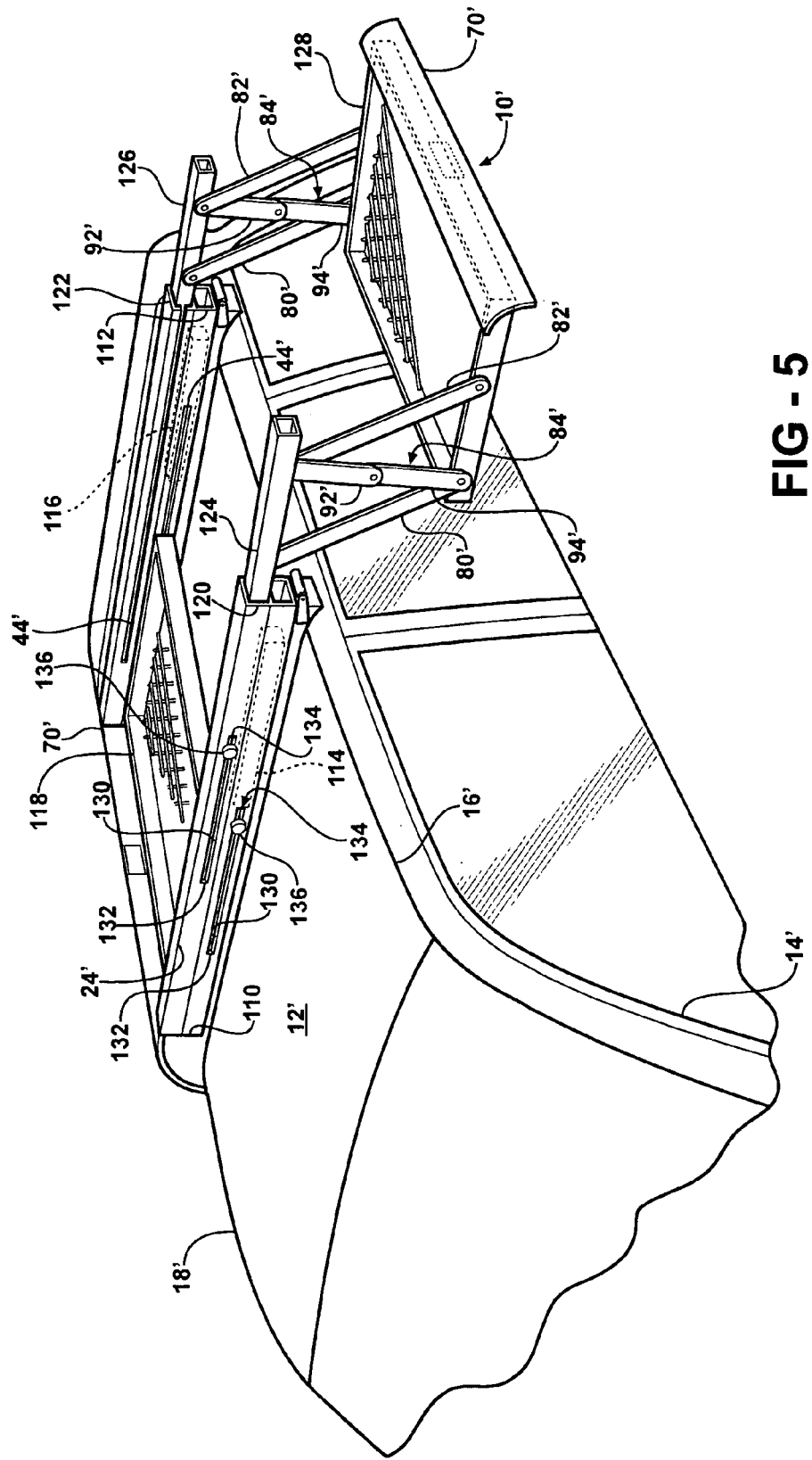
FIG. 5 is a fragmentary, perspective view of a motor vehicle including a roof rack assembly according to a second embodiment of the invention.

Referring to FIG. 5, wherein like primed reference numerals represent similar elements as those described above, a second embodiment of the invention is shown in which the roof rack assembly 10' includes front 110 and rear 112 lower guides extending laterally between the opposing sides 16', 18' of the roof 12'. Front 114 and rear 116 lower rails slidingly engage the respective front 110 and rear 112 lower guides. A first tray 118 is coupled to the front 114 and rear 116 lower rails by the inboard 80' and outboard 82' drop down links. The first tray 118 moves between a storage position above the roof 12' and a loading position extending from one 18' of the sides 16', 18' of the roof 12'.

Front 120 and rear 122 upper guides are stacked on top of the respective front 110 and rear 112 lower guides. Front 124 and rear 126 upper rails slidingly engage the respective front 120 and rear 122 upper guides. A second tray 128 is coupled to the front 124 and rear 126 upper rails by the inboard 80' and outboard 82' drop down links. The second tray 128 moves between a storage position above the roof 12' and a loading position extending from the other one 16' of the sides 16, 18' of the roof 12'.

The first 118 and second 128 trays move relative to the respective lower 110, 112 and upper 120, 122 guides in exactly the same manner. For this reason, only the relationship between the second tray 128 and the upper guides 120, 122 will be described below with the understanding that the same applies equally to the first tray 118 and the lower guides 110, 112.

Each of the front 120 and rear 122 upper guides include a middle slot 130 extending along the outboard surface 24' thereof. The middle slot 130 includes opposing limit ends 132, 134. Each of the front 124 and rear 126 upper rails includes a middle pin 136 slidingly engaging the middle slot 130. As the middle pin 136 moves between the limit ends 132, 134 of the middle slot 130, the front 124 and rear 126 upper rails move the second tray 128 between the loading and storage positions.

Since the front 120 and rear 122 upper guides extend across the entire width of the roof 12', the front 124 and rear 126 upper rails as well as the inboard 80' and outboard 82' drop links may extend along a large portion of or length of the front 120 and rear 122 upper guides. Thus, when the second tray 128 is in the loading position, the elevation thereof relative to the ground will depend on the length of both the front 124 and rear 126 upper rails and the inboard 80' and outboard 82' drop links.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A roof rack assembly for storing items above a roof of a motor vehicle, said roof rack assembly comprising:
    a frame including front and rear guides extending across the roof;
    a front rail slidingly engaging said front guide;
    a rear rail slidingly engaging said rear guide;
    a tray coupled to said front and rear guides and movable between a storage position above the roof and a loading position alongside the motor vehicle;
    a plurality of drop down links extending between said tray and each of said front and rear rails for maintaining said tray in a horizontal orientation as said tray moves between said storage and loading positions; and
    a scissor linkage extending between said drop down links for selectively locking said tray in said loading position.

2. A roof rack assembly as set forth in claim 1 wherein said scissor linkage includes first and second scissor links pivotally secured to each other.

3. A roof rack assembly as set forth in claim 2 wherein one of said first and second scissor links includes a locking tab for locking said first and second scissor links in a colinear orientation to hold said tray in said loading position.

4. A roof rack assembly as set forth in claim 3 wherein each of said front and rear guides includes an elongated slot extending therealong.

5. A roof rack assembly as set forth in claim 4 wherein each of said front and rear rails includes an outwardly extending sliding pin slidingly engaging said elongated slot along said respective front and rear guides.

6. A roof rack assembly as set forth in claim 5 wherein each of said front and rear rails defines a pin catch hole.

7. A roof rack assembly as set forth in claim 6 wherein each of said front and rear guides includes a spring loaded pin selectively engaging each of said pin catch holes along said respective front and rear rails to stop said front and rear rails from disengaging from said front and rear guides.

8. A roof rack assembly as set forth in claim 7 including a lift assist mechanism operatively connected to said front and rear rails for aiding movement of said tray from said loading position to said storage position.

9. A roof rack assembly as set forth in claim 8 wherein said lift assist mechanism includes a rod extending between said front and rear guides.

10. A roof rack assembly as set forth in claim 9 wherein said lift assist mechanism includes a cable extending between said rod and each of said front and rear rails.

11. A roof rack assembly as set forth in claim 10 wherein said lift assist mechanism includes a torsion spring secured to said rod wherein said torsion spring selectively rotates said rod for winding said cables around said rod to move said tray into said storage position.

12. A roof rack assembly as set forth in claim 11 including a center tie guide extending between said front and rear guides for housing said rod.

13. A roof rack assembly as set forth in claim 12 wherein said tray includes a latch mechanism for selectively locking said tray in said storage position.

14. A roof rack assembly for storing items above a roof of a motor vehicle, said roof rack assembly comprising:
a frame including front and rear guides extending across the roof;
a front rail slidingly engaging said front guide;
a rear rail slidingly engaging said rear guide;
a tray coupled to said front and rear guides and movable between a storage position above the roof and a loading position alongside the motor vehicle;
a plurality of drop down links extending between said tray and each of said front and rear rails for constantly maintaining said tray in a horizontal orientation; and
a lift assist mechanism operatively connected to said front and rear rails for aiding movement of said tray into said storage position.

15. A roof rack assembly as set forth in claim 14 wherein said lift assist mechanism includes a rod extending between said front and rear guides.

16. A roof rack assembly as set forth in claim 15 wherein said lift assist mechanism includes a cable extending between said rod and each of said front and rear rails.

17. A roof rack assembly as set forth in claim 16 wherein said lift assist mechanism includes a torsion spring secured to said rod wherein said torsion spring selectively rotates said rod for winding said cables around said rod to move said tray into said storage position.

18. A roof rack assembly as set forth in claim 17 including a scissor linkage extending between said drop down links for selectively locking said tray in said loading position.

19. A roof rack assembly as set forth in claim 18 wherein said scissor linkage includes first and second links pivotally secured to each other.

20. A roof rack assembly as set forth in claim 19 wherein one of said first and second scissor links includes a locking tab for locking said first and second scissor links in a colinear orientation to hold said tray in said loading position.

21. A roof rack assembly for storing items above a motor vehicle roof having opposing first and second sides, said roof rack assembly comprising:
a frame including front and rear lower guides extending across the roof and front and rear upper guides disposed above said respective front and rear lower guides;
front and rear lower rails slidingly engaging said front and rear lower guides;
a first tray coupled to said front and rear lower rails and movable between a storage position above the roof and a loading position extending from the first side of the motor vehicle;
front and rear upper rails slidingly engaging said front and rear upper guides;
a second tray coupled to said front and rear upper rails and movable between a storage position above the roof and a loading position extending from the second side of the motor vehicle roof; and
a plurality of drop down links extending between said first and second trays and said respective lower and upper rails for maintaining said first and second trays in a horizontal orientation during movement thereof between said storage and loading positions.

22. A roof rack assembly as set forth in claim 21 including scissor linkages extending between said drop down links for selectively locking said first and second trays in said loading position.

23. A roof rack assembly as set forth in claim 22 wherein each of said scissor linkages includes first and second scissor links pivotally secured to each other.

24. A roof rack assembly as set forth in claim 23 wherein one of said first and second scissor links includes a locking tab for locking said first and scissor second links in a colinear orientation to hold said first and second trays in said loading position.

25. A roof rack assembly as set forth in claim 24 wherein each of said upper and lower guides includes a middle slot extending along a portion thereof.

26. A roof rack assembly as set forth in claim 25 wherein each of said upper and lower rails includes an outwardly extending middle pin slidingly engaging said middle slot along said respective upper and lower guides to move said first and second trays between said storage and loading positions.

* * * * *